United States Patent
Selva Bellvis

(10) Patent No.: US 12,503,000 B2
(45) Date of Patent: Dec. 23, 2025

(54) OPTIMIZATION PROCEDURE FOR THE ENERGY MANAGEMENT OF A SOLAR ENERGY INSTALLATION WITH STORAGE MEANS IN COMBINATION WITH THE CHARGING OF AN ELECTRIC VEHICLE AND SYSTEM

(71) Applicant: TURBO ENERGY, S.A., Valencia (ES)

(72) Inventor: Enrique Selva Bellvis, Valencia (ES)

(73) Assignee: TURBO ENERGY, S.A., Valencia (ES)

( * ) Notice: Subject to any disclaimer, the term of this patent is extended or adjusted under 35 U.S.C. 154(b) by 0 days.

(21) Appl. No.: 18/834,620

(22) PCT Filed: Jun. 9, 2023

(86) PCT No.: PCT/ES2023/070382
§ 371 (c)(1),
(2) Date: Jul. 30, 2024

(87) PCT Pub. No.: WO2023/237804
PCT Pub. Date: Dec. 14, 2023

(65) Prior Publication Data
US 2025/0108720 A1    Apr. 3, 2025

(30) Foreign Application Priority Data
Jun. 9, 2022    (ES) .............. ES202230508

(51) Int. Cl.
*B60L 53/64*    (2019.01)
*G06Q 10/0631*    (2023.01)
(Continued)

(52) U.S. Cl.
CPC .......... *B60L 53/64* (2019.02); *G06Q 10/0631* (2013.01); *H02J 3/003* (2020.01);
(Continued)

(58) Field of Classification Search
None
See application file for complete search history.

(56) References Cited

U.S. PATENT DOCUMENTS

2011/0290893 A1* 12/2011 Steinberg ........... G05D 23/1905
236/51
2013/0127417 A1* 5/2013 Karner .................... B60L 50/30
320/109
(Continued)

FOREIGN PATENT DOCUMENTS

CN    110979083 A    4/2020
DE    102016109181 A1    11/2017
(Continued)

OTHER PUBLICATIONS

João Carlos Ferreira, Simulation of Electrical Distributed Energy Resources for Electrical Vehicles Charging Process Strategy, 2010 Second Brazilian Workshop on Social Simulation (Year: 2010).*
(Continued)

*Primary Examiner* — Jerry O'Connor
*Assistant Examiner* — Matthew H Divelbiss
(74) *Attorney, Agent, or Firm* — Banner & Witcoff, Ltd.

(57) ABSTRACT

Operating procedure and system used to optimise costs in the charging process of an electric vehicle, in combination with the consumption of a home or similar, the management of auxiliary batteries, and the production of solar energy from the processing of external information, and the action on system operating parameters.

4 Claims, 1 Drawing Sheet

(51) Int. Cl.
    *H02J 3/00*       (2006.01)
    *H02J 3/28*       (2006.01)
    *H02J 3/38*       (2006.01)
    *H02S 50/00*     (2014.01)
    *B60L 53/51*     (2019.01)

(52) U.S. Cl.
    CPC ................ *H02J 3/004* (2020.01); *H02J 3/28* (2013.01); *H02J 3/38* (2013.01); *H02S 50/00* (2013.01); *B60L 53/51* (2019.02); *H02J 2300/24* (2020.01)

(56) References Cited

U.S. PATENT DOCUMENTS

2016/0164299 A1    6/2016   Becattini et al.
2017/0361717 A1*  12/2017  Qin ........................ B60L 53/11
2019/0351783 A1*  11/2019  Goei ....................... G08G 1/202
2020/0039367 A1*   2/2020  Lyden ..................... B60L 53/51

FOREIGN PATENT DOCUMENTS

WO         2012103138 A1    8/2012
WO    WO-2018129828 A1 *  7/2018  ............ G06Q 10/04

OTHER PUBLICATIONS

Aug. 7, 2023—(WO) International Search Report & Written Opinion—App. No. PCT/ES2023/070382.

Molina, D. et al. Optimal EV charge-discharge schedule in smart residential buildings. IEEE, Jul. 13, 2012 [on line] [retrieved on Mar. 8, 2023]. Retrieved from <URL: https://ieeexplore.ieee.org/document/6498643>, <DOI: 10.1109/PowerAfrica.2012.6498643> Abstract, figure 2, paragraphs I-V.

* cited by examiner

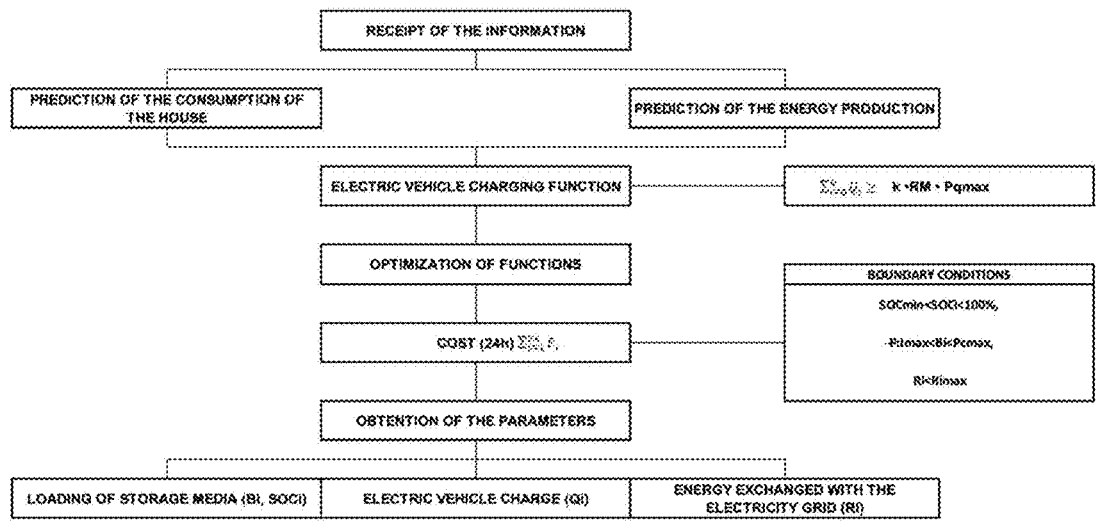

OPTIMIZATION PROCEDURE FOR THE ENERGY MANAGEMENT OF A SOLAR ENERGY INSTALLATION WITH STORAGE MEANS IN COMBINATION WITH THE CHARGING OF AN ELECTRIC VEHICLE AND SYSTEM

CROSS-REFERENCE TO RELATED APPLICATIONS

The present application claims priority from and is a U.S. National Phase of International Application No. PCT/ES2023/070382, which was filed on Jun. 9, 2023, designating the United States of America and claiming priority to Spanish Patent Application No. P202230508, filed on Jun. 9, 2022. This application claims priority to and the benefit of the above-identified applications, which are all fully incorporated by reference herein in their entireties.

TECHNICAL SECTOR

The present invention falls within the field of energy management systems for facilities that include the generation of photovoltaic solar energy, particularly in facilities that include storage media, in combination with the charging of an electric vehicle.

Specifically, the invention describes a procedure for optimizing the energy management of an installation with solar energy generation means and energy storage means, in which an electric vehicle is connected for charging, depending on charging parameters. minimum set by the user.

BACKGROUND OF THE INVENTION

Currently, energy management systems are widely known, which include both the use of self-generated solar energy and the charging of electric vehicles.

We can find, for example, document US2016164299, which describes an apparatus for energy conversion and management comprising: input terminals coupled to an input DC voltage, an inverter, with a first DC-DC conversion stage and a second DC-AC conversion stage, with a battery charger module, and an associated battery that stores energy from the first DC-DC stage during recharging, and supplies energy to the second DC-AC stage.

Where the device comprises a power meter, which monitors the input and output power from the inverter module, and the power absorbed or supplied to the network, and a switching unit, in direct connection with a control unit. And where the control unit adjusts the operation of the inverter module and the switching unit based on predefined algorithms.

Document US2019351783 describes a system for controlling a plurality of mobile EV charging platforms, comprising: a central server, a communications interface for transmitting and receiving control data between the central server and the system object of the invention, a database data that stores information about the system and the EVs that connect to it; and a controller including AI software, which generates control data to program the meeting location between the EV and the mobile charging platform, in response to the position and data of the platform, and the position and data of the EV.

That is, the aforementioned invention aims to optimize the charging place of an EV from a charging system with a plurality of charging platforms, indicating the position in which the EV must recharge from the initial positions. starting point for both elements.

We can also find document US2017361717 that describes an EV fast charging system using solar energy, comprising: an EV fast charging system installed in any service area; and a solar energy generation system, used as an energy source for the fast charging system.

The objective of the invention is to achieve a system that allows rapid charging of an EV, particularly in minutes instead of hours, for those EV users who run out of battery while traveling.

Document DE102016109181 describes a method for controlling the charging process of a rechargeable battery, which comprises at least one photovoltaic module, so that the electrical charging energy will depend on the instantaneous radiation on said photovoltaic module, which will be detected by using of a photodetector. This information will be sent to a control unit, which will manage the charging power at all times.

Likewise, the device to control the previous charging process is described, which comprises: an energy accumulator; a photovoltaic module; and a control device connected to a photodetector that will comprise the same orientation as the photovoltaic module. In this way, the control unit will manage the power delivery, such as the start time of the charging process.

However, none of the documents belonging to the state of the art describe systems that allow the application of different charging modes, in application of a user-defined charging function, which will be managed by software with an optimization algorithm, based on of the solar energy generated, the energy stored, the demand of the installation, and the minimum charging needs of the vehicle.

EXPLANATION OF THE INVENTION

The optimization system for charging an electric vehicle and the associated procedure that the invention proposes is, therefore, configured as a notable novelty within its field of application, since according to its implementation and in an exhaustive manner, the objectives are satisfactorily achieved. previously indicated, the characterizing details that make it possible and that distinguish them are conveniently included in the final claims that accompany this description.

Specifically, the present invention describes a system used to optimize costs in the charging process of an electric vehicle, in combination with the consumption of a home or similar, the management of auxiliary batteries, and the production of solar energy from the processing of external information and acting on system operating parameters.

To achieve this, the invention comprises a direct connection socket to the general electrical grid, means for generating electricity from photovoltaic energy, and storage means, such as batteries.

Likewise, the invention includes processing means, located on site in the facility, or on an external server in the cloud, which will be in charge of receiving the external information, process it in combination with the operating parameters of the system itself, and act on those necessary to achieve an optimization of the cost of the energy used in charging an electric vehicle, in combination with the consumption requirements of the home.

This control unit will comprise communication means, preferably wireless, that will receive information on the history of electrical generation using photovoltaic energy;

the history of housing consumption; and weather prediction, such as wind, temperature, humidity or radiation.

In this situation, the control unit will process the information by applying predictive models, and will optimize the expenditure on electrical energy to charge the electric vehicle and manage the auxiliary storage batteries, in combination with the requirements of housing consumption.

Specifically, the models used are based on the application of an Artificial Intelligence algorithm, hereinafter AI, which aims to anticipate the amount of energy required by the home and the production of electrical energy through photovoltaic energy, in the next 24-hour period.

In this way, it manages to optimize the energy cost of the day after its application. To anticipate the amount of energy required by the home, data from the home's consumption history will be used, assuming homogeneous consumption; meteorological information, which can influence the habits of the home's occupants; and the corresponding calendar day, which may vary consumption needs depending on whether it is a holiday or a business day.

Based on this information, and with the application of the AI algorithm, the prediction of the home's consumption in the next 24 hours is made, without taking into account the consumption made for charging the electric vehicle.

To anticipate the energy production of the home, the production history, the position of the sun and meteorological data associated with the estimated production, and the future forecast, both of the solar position and meteorological data, such as radiation, will be used. horizontal, humidity, temperature, wind speed and direction.

From this information, and with the application of the AI algorithm, the prediction of minimum housing production in the next 24 hours is made.

In parallel to the previous models used, the control unit will also receive information on other parameters external to the home itself, and its associated energy consumption and production.

On the one hand, information will be received on energy prices per kWh for each hour of the next 24 hours; and energy export prices, that is, the price at which each kWh sent to the grid is paid, of those generated in excess.

These data allow us to estimate the total cost of energy in the next 24 hours, taking into account both consumption and surpluses.

On the other hand, and considering the charging of the electric vehicle, a charging mode is defined for the same by the user, in which a charging ramp is applied, which will represent the minimum percentage of charging power in relation to the total power. of the charger that is required from the system charger.

Once the pertinent calculations have been made, and the necessary external information has been received, the system optimizes the costs based on an expression that considers all the previous parameters, analyzing which of them to act on to obtain a lower energy cost in the following 24 hours.

Particularly, an optimization of two hourly decision vectors will be carried out, regarding the amount of charging to be carried out on the EV and how much energy we take from the network to satisfy the demand and how much storage batteries.

The optimization system for charging an electric vehicle, the associated procedure and the set of elements described represent an innovation with structural and constitutive characteristics unknown until now, reasons that, together with its practical usefulness, provide it with sufficient foundation to obtain the exclusivity privilege requested.

BRIEF DESCRIPTION OF THE DRAWINGS

To complement the description that is being made and in order to help a better understanding of the characteristics of the invention, a set of drawings is attached as an integral part of said description, where, with an illustrative and non-limiting nature, the following has been represented. following:

FIG. 1.—Shows a diagram of the procedure object of the present invention.

PREFERRED EMBODIMENT OF THE INVENTION

In the following detailed description of the preferred embodiments, reference is made to the accompanying drawings that form part of this specification, and in which specific preferred embodiments in which the invention can be carried out are shown by way of illustration. These embodiments are described in sufficient detail to allow those skilled in the art to carry out the invention, and it is understood that other embodiments may be used and that logical structural, mechanical, electrical and/or chemical changes may be made without departing from the scope of the invention. To avoid details not necessary to enable those skilled in the art to carry out the detailed description should therefore not be taken in a limiting sense.

Specifically, the present invention describes an optimization procedure for the energy management of a home combined with the charging of an electric vehicle, which includes at least means for charging an electric vehicle, means for connecting to the electrical network, means for electrical generation, such as a photovoltaic energy source, such as solar panels, and electrical energy storage means, such as batteries, all of the above means connected to a control unit with processing means; the entire set being installed in a home.

Where the procedure is configured to optimize the charging of an electric vehicle in a given period of time, preferably 24 hours in advance, and includes at least the following steps:

First of all, the necessary information is received for the given period of time on at least:
  i. the history of electrical energy production through the means of electrical generation;
  ii. the history of housing consumption;
  iii. Historical meteorological data associated with historical production and consumption.
  iv. the date;
  v. energy prices;
  vi. and the weather forecast and/or other associated data;

Secondly, the calculation of the prediction of housing consumption in the given period of time is carried out from:
  i. the historical consumption of the home, and meteorological data;
  ii. the weather forecast;
  iii. and the date of the calculation period.

Thirdly, the calculation of the prediction of the energy production of the home in the given period of time is carried out, based on:
  i. the history of housing production and associated meteorological data
  ii. the relative position of the sun at each moment in the installation, preferably the elevation and azimuthal angles;
  iii. and the weather forecast, hourly radiation, temperature, wind speed and direction.

Finally, the cost optimization process begins.

As preliminary information, it is worth considering the requirements that we establish regarding the vehicle loading process on which the user defines their needs in this regard. In this sense, the increase in the load of the electric vehicle (SQi) for each hour i is configured according to a load function of the electric vehicle, of so that the accumulated charge of the electric vehicle in each hour i cannot be less than that indicated by the charging function.

To do this, preferably, a "ramp" function is defined, to which a condition is imposed to be satisfied by the procedure, and that is to guarantee a minimum of energy accumulated in the electric vehicle for each hour of calculation, leaving free the possibility of anticipating charges at a certain time when the cost of energy is lower or a surplus is being generated, avoiding charging the electric vehicle at times of highest cost.

That is, for any k between 1 and 24, the following must be satisfied:

$$\sum_{i=0}^{k} Q_i \geq k \cdot RM \cdot PQ_{max}$$

Where:
RM is the minimum load slope defined by the user (between 0 and 1).
$PQ_{max}$ is the maximum power of the electric charger.
$Q_i$ is the hourly charge of the electric charger.

The equation to optimize is the energy cost of the next period, preferably 24 hours, satisfying all the needs established by the demand based on the formula:

$$Cost(24\ h) \Sigma_{i=1}^{24} E_i$$

Where Ei is the costo f exchanging energy with the network, so that:
If energy is being demanded from the grid, then Ri>0; and Ei=Ri Pi
otherwise, that is, energy is being poured into the electrical grid, due to an excess of generation with respect to consumption, then Ri<0, and Ei=Ri PXi
Where Ri is the energy demand of the electrical grid, Pi is the unit price of energy acquisition for hour i and PXi is the unit price of energy export/compensation for hour i.

To optimize this equation we must establish the links between the elements that make up the system. To do this, the optimization function will use a second equation, related to the loading of the storage media. In this sense:

$$SOC_i = SOC_{i-1} + [R_i + \eta B_i + G_i - Q_i - C_i]/BATT;'$$

Where:
The estate of charge of the batteries in the previous hour is: (SOCi−1), y BATT is the total capacity of the battery bank.
The expected energy demand for the next 24 hours from the electrical grid (Ri), Vector to optimize.
The increase and/or decrease in the load of the storage media (Bi).
The electricity generation planned for the next 24 hours (Gi).
The increase in the load of the Vector electric vehicle to be optimized. (Qi),—and the planned consumption in the home (Ci), H is the Battery Charge/Discharge efficiency
η is the Battery Charge/Discharge efficiency
That is, the procedure must optimize the energy cost function:

$$Cost(24\ h) \Sigma_{i=1}^{24} E_i$$

Respecting the equation that regulates the relationship between the variables of the system:

$$SOC_i = SOC_{i-1} + [R_i + \eta B_i + G_i - Q_i - C_i]/BATT\ (i: 1\ ...\ 2)$$

Under the following boundary conditions:
SOCmin<SOCi<100%, that is, the load of the storage media must be kept above a previously established value, and obviously cannot be higher than 100%-
Pdmax<Bi<Pcmax, where Pcmax is the maximum charging power and Pdmax is the maximum discharge power of the battery rack.
Ri<Rimax With Rimax being the maximum power of Network Use (contracted power)
And the boundary condition established in the minimum load criterion for electric vehicle ramps.

$$\sum_{i=0}^{k} Q_i \geq k \cdot RM \cdot PQ_{max}$$

The optimization results are the SOC, Battery, Network and EV charging vectors ($SOC_i$, $B_i$, $R_i$, $Q_i$) with i 1 . . . 24

With the Qi vector, the charging of the EV is programmed, by modulating the charging power hour by hour to meet the requirements, or in the case of a constant power charger, alternating charging periods with stop periods to adjust the desired load to the results of the optimization algorithm.

In the case of Storage Management (Bi, SOCi) We will program the operating modes of the hourly inverter so that, if requested by the algorithm, charge Batteries up to a certain SOC, reserve Battery capacity for future periods, or work in normal operation, having the Battery capacity also to meet consumption.

This allows an optimization of the energy taken from the network, based on the established parameters, for the 24 hours following the calculation, anticipating the needs of each electrical generation system, minimizing the impact of the purchase of electricity from the general power grid.

Preferably, the optimization process is carried out continuously at least once per hour, and the optimal EV management and charging decisions are recalculated for the following 24 hours, acting accordingly.

That is, with this last embodiment, not only is better intelligent management of energy storage achieved, but it is also possible to optimize the charging costs of an electric vehicle, in response to a charging function of the same that is requested by the user of the electric vehicle itself, where the procedure ensures that the minimum load of the vehicle will be, at least, that required by the user in each of the hours.

The present invention also describes the system that will apply the procedure of the previous embodiments, which will comprise at least:
means of connection to the general electrical network;
means of electrical generation;
electrical energy storage means;
means of charging an electric vehicle;
wireless communication means, configured to receive external information from the system and information processing means, operatively connected to the previous means, which may be located directly in a control unit included in the home installation, or in an external server located in the cloud.

Where the processing means are configured to receive information about the history of electrical generation of the home, the history of consumption of the home, the date, the price per kWh of the general electrical network, and the weather.

And to apply an AI algorithm configured to manage the means of connection to the electrical grid and the means of storing electrical energy, and optimize the expenditure on electrical energy.

That is, the system will be prepared to receive the relevant information for each hour of calculation, and process it to optimize the cost of energy.

Preferably, the AI algorithm applied by the control unit will be responsible for calculating the costs, based on the result of the optimization algorithm, in application of the optimization procedure described above. That, as explained previously, the value of Ri depends on the load of the electrical energy storage media (SOCi) for each hour i. And it may vary according to two operating conditions.

Having sufficiently described the nature of the present invention, as well as the way of putting it into practice, it is not considered necessary to make its explanation more extensive so that any expert in the field understands its scope and the advantages derived from it, stating that, Within its essentiality, it may be put into practice in other forms of embodiment that differ in detail from the one indicated as an example, and to which the protection sought will also be achieved as long as its fundamental principle is not altered, changed or modified.

The invention claimed is:

1. A method of charging an electric vehicle from a house solar energy installation with storage means comprising the steps of:
   connecting the electric vehicle to an electrical network of the house, the electrical network connected to the house solar energy installation, the house solar energy installation producing and storing electrical energy and providing the electrical energy through the house electrical network to the house and to the electric vehicle,
   providing a control unit that controls the provision of the electrical energy to the house and to the electric vehicle, the control unit controlling and optimizing the provision of the electrical energy by the following steps:
   a. Receipt of information for the given period of time on at least:
      i. The history of electrical energy production through the means of electricity generation;
      ii. The history of consumption of the house with its associated historical meteorological data;
      iii. The date;
      iv. Both purchase and export/compensation energy prices;
      v. Weather forecast, Horizontal Radiation, wind speed, wind direction, Temperature and/or Humidity;
   b. Calculation of the prediction of the consumption of the house in the period of time given from:
      i. The history of consumption of the house with its associated historical meteorological data;
      ii. Weather forecast, Horizontal Radiation, wind speed, wind direction, Temperature and/or Humidity;
      iii. And the date of the calculation period;
   c. Calculation of the prediction of the energy production of the house in the given period of time, from:
      i. The production history of the house with its orbital position data of the sun and the associated historical meteorological data of Horizontal Radiation, wind speed, wind direction, Temperature and/or Humidity;
      ii. The position of the sun at each moment of the period to be predicted;
      iii. And the weather forecast Horizontal Radiation, wind speed, wind direction, Temperature and/or Humidity;
   d. Introduction of the charging requirements of the electric vehicle by the user, from an electric vehicle charging function, configured as a lower limit condition of the electric vehicle charge;
   e. Optimization of:
      i. The energy cost function demands the electricity grid, according to the formula: Cost (24 h) $\Sigma_{i=1}^{24} E_i$
      ii. Using the equations that govern the relationships between the parameters to be optimized according to the formula: SOCi=SOCi−1+[Ri+]Bi+Gi−Qi−Ci]/BATT and respecting the boundary conditions:
      SOCmin<SOCi<100%,
      Pdmax<Bi<Pcmax,
      Ri<Rimax
      And the electric vehicle charging function,
   f. Obtaining, from the previous optimization, the parameters of:
      i. Loading of storage media (Bi, SOCi);
      ii. Electric vehicle charging (Qi);
      iii. And energy exchanged with the electricity grid (Ri) where the parameters are obtained for each hour of calculation
   g. Initiating a charging of the electric vehicle through the use of a charging means;
      characterized in that the charging function of the electric vehicle is configured as a ramp to provide a minimum amount of energy to the electric vehicle and wherein the ramp is configured according to the formula:

$$\sum (i=0)^{\wedge} k\, Qi \geq k \cdot RM \cdot PQmax.$$

So that the charge of the electric vehicle in each hour i cannot be less than that indicated by the charging function for the same hour i.

2. The method of claim 1, characterized in that the optimization is carried out through the application of the Simplex method.

3. The method of claim 1 characterized in that the optimization is carried out for the following 24 hours of operation.

4. The method of claim 3 characterized in that it is repeated continuously every hour, performing the updated optimization for the following 24 hours of operation.

* * * * *